(12) United States Patent
Riou et al.

(10) Patent No.: US 10,288,510 B2
(45) Date of Patent: May 14, 2019

(54) FOOTED PRESSURE MEASURING DEVICE

(71) Applicant: SAFRAN ELECTRONICS & DEFENSE, Boulogne Billancourt (FR)

(72) Inventors: Jean-Christophe Riou, Boulogne Billancourt (FR); Eric Bailly, Boulogne Billancourt (FR)

(73) Assignee: SAFRAN ELECTRONICS & DEFENSE, Boulogne Billancourt (FR)

(*) Notice: Subject to any disclaimer, the term of this patent is extended or adjusted under 35 U.S.C. 154(b) by 26 days.

(21) Appl. No.: 15/579,095

(22) PCT Filed: Jun. 1, 2016

(86) PCT No.: PCT/EP2016/062416
§ 371 (c)(1),
(2) Date: Dec. 1, 2017

(87) PCT Pub. No.: WO2016/193325
PCT Pub. Date: Dec. 8, 2016

(65) Prior Publication Data
US 2018/0172534 A1    Jun. 21, 2018

(30) Foreign Application Priority Data

Jun. 3, 2015 (FR) .................................... 15 55040

(51) Int. Cl.
*G01L 9/00* (2006.01)
*G01L 19/06* (2006.01)
*G01L 19/14* (2006.01)

(52) U.S. Cl.
CPC .......... *G01L 9/0072* (2013.01); *G01L 9/0048* (2013.01); *G01L 19/06* (2013.01); *G01L 19/14* (2013.01); *G01L 19/147* (2013.01)

(58) Field of Classification Search
None
See application file for complete search history.

(56) References Cited

U.S. PATENT DOCUMENTS

| 4,689,999 A * | 9/1987 | Shkedi .................... G01L 19/02 361/283.3 |
| 4,972,716 A | 11/1990 | Tobita et al. |
| 6,374,680 B1 * | 4/2002 | Drewes ................. G01L 9/0075 73/718 |
| 6,431,003 B1 | 8/2002 | Stark et al. |
| 2011/0256652 A1 | 10/2011 | Guo et al. |
| 2018/0038754 A1 * | 2/2018 | Marsh ................... G01L 9/0073 |

* cited by examiner

*Primary Examiner* — Andre Allen
(74) *Attorney, Agent, or Firm* — Muncy, Geissler, Olds & Lowe, P.C.

(57) ABSTRACT

A pressure measuring device comprising a bracket supporting a pressure sensor which defines a first sealed enclosure with a first face of the bracket, with the pressure measuring device comprising a substrate having opposite faces, opposite which a first deformable membrane and a second deformable membrane respectively extend, with the first membrane and the second membrane respectively defining with the substrate a second sealed enclosure and a third sealed membrane, with the pressure sensor comprising a cover in order to define a fourth sealed enclosure connected through a second channel to the first enclosure, with the pressure sensor comprising means for measuring the deformation of the first and the second deformable membranes.

9 Claims, 1 Drawing Sheet

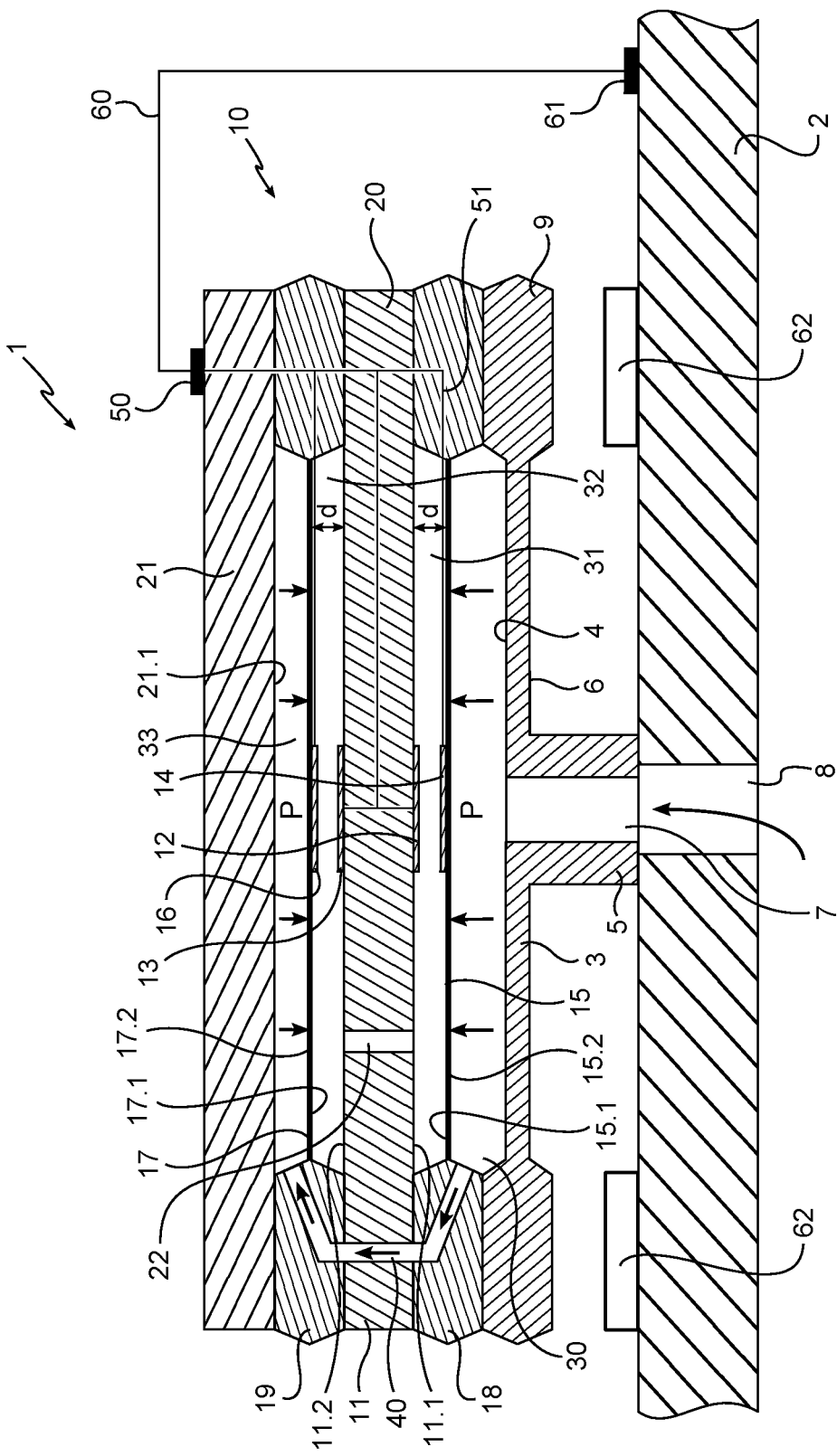

FOOTED PRESSURE MEASURING DEVICE

FIELD OF THE INVENTION

The present invention relates to the field of pressure measuring and more particularly the fluid pressure electromechanical sensors for applications in aeronautics, and specifically sensors of the MEMS type.

BACKGROUND OF THE INVENTION

An electro-mechanical pressure sensor generally comprises a membrane made of silicon or silicon alloy on the front face of which piezoelectric strain gage mounted as a Wheatstone bridge and connected to an electronic processing unit by connection wires are added. The back face, opposite the one supporting the gages, is exposed to a pressure to be measured, which, when causing the membrane to buckle, actuates the gages and enables making an electric measuring of pressure. The membrane is generally mounted on a substrate which is made of silicon too. As silicon is particularly sensitive to electrochemical attacks, the membrane is mounted at the end of a conduit filled with a transfer fluid, generally silicone oil. The other end of the conduit is closed by a stainless steel pellet, the outer face of which is in contact with the fluid, the pressure of which has to be measured. The pressure applied to the stainless steel pellet is transmitted, through the transfer fluid, to the silicon membrane and measured by the processing unit from the signals supplied by the strain gages. The electric signal generated by the processing unit is then transmitted to a communication network.

The thus obtained sensor is generally cumbersome, heavy and expensive, specifically because of the presence of the oil-filled conduit and the sealing elements associated thereto. As a matter of fact, the oil has to be absolutely incompressible and such oils are expensive and freeze at a low temperature, and thus transmit the vibrations. When they are not totally free of impurities and/or free radicals, such oils generate electric drifts when they are exposed to electric voltage. The cylindrical conduit must be filled with extreme precautions since the presence of air in the conduit would make the sensor inaccurate or even inoperative. Such operation and the checking thereof increase the cost of production of the sensor. Eventually, such sensor is extremely sensitive to quick variations in the temperature of the fluid, the pressure of which has to be measured. As a matter of fact, although piezoelectric sensors are well known as having a reduced sensitivity to temperature variations, the behaviour of the transfer fluid and the conduit entail mistakes which can be corrected with difficulty. Finally, at extremely low temperatures, the transfer fluid may freeze and make the sensor inoperative.

SUBJECT OF THE INVENTION

The invention aims at reducing the cost and the thermal sensitivity of an electro-mechanical pressure sensor.

SUMMARY OF THE INVENTION

For this purpose, the invention provides for a pressure measuring device comprising a bracket supporting a pressure sensor which defines a first sealed enclosure with a first face of the bracket, with the bracket having a second face from which a mounting foot protrudes. The device also comprises a first channel extending at least into the foot to open into the first enclosure. According to the invention, the pressure measuring device comprises a substrate having opposite faces, opposite which a first deformable membrane and a second deformable membrane respectively extend, with the first membrane and the second membrane extending at a distance from the substrate while defining therewith a second sealed enclosure and a third sealed membrane, with the pressure sensor comprising a cover extending opposite the second membrane in order to define a fourth sealed enclosure connected through a second channel to the first enclosure. The pressure sensor also comprises means for measuring the deformation of the first and the second deformable membranes.

The sealed enclosures are intended to contain the fluid and to isolate the membranes from the pressure from the external medium. The thus obtained device comprises one pressure measuring element directly exposed to the fluid, the pressure of which has to be measured. The absence of transfer oil makes it possible to obtain a lighter device, less expensive to produce. The application of pressure on either side of the substrate makes it possible to balance the stress inside the substrate and improves the linearity and the accuracy of the device.

According to one particularly advantageous embodiment, the means for measuring the deformation of the membrane comprise a pair of first electrodes, each extending on one face of the substrate and opposite which a second electrode integral with the first deformable membrane and a thirst electrode integral with the second deformable membrane respectively extend. The deformation of the first and the second membranes can then be measured by measuring the capacity of the thus obtained variable capacitors. The sensitivity of capacitive sensors to thermal variations is almost null and the device according to this embodiment requires only little or no temperature compensation.

The second channel advantageously extends at least through a periphery of the first deformable membrane, the substrate and the second deformable membrane. The device remains compact and requires no outer conduit to bring pressure to the second membrane.

According to a specific embodiment, the cover comprises a processing unit for delivering an electric signal according to the distances from the first electrodes to the second and the third electrodes. Integrating the processing unit directly in the measuring device makes it possible to obtain a more compact device and limits the by-passes which may cause defects.

The second and third sealed enclosures advantageously are at a substantially null absolute pressure. This facilitates the calibration of the device and enables absolute pressure measuring.

According to another advantageous embodiment, the outer surface of the device comprises a parylene coating which makes it possible to preserve the device from environmental stress.

The second face of the bracket is advantageously still so arranged as to cooperate with end stops. The deformation of the foot of the device resulting from mechanical stress is limited to permissible values, which ensures the device integrity.

Other characteristics and advantages of the invention will become apparent upon reading the following description of particular non-restrictive embodiments of the invention.

BRIEF DESCRIPTION OF THE DRAWINGS

Reference will be made to the single FIGURE which is a schematic cross-sectional view of the invention.

DETAILED DESCRIPTION OF THE INVENTION

Referring to FIG. 1, the pressure measuring device according to the invention, generally referred 1, is mounted on a support 2 and comprises a bracket 3 supporting a pressure sensor 10. The sensor 10 defines a first sealed enclosure 30 with a first face 4 of the bracket 3. A mounting foot 5 protrudes from a second face 6 of the bracket 3 opposite the first face 4 thereof, up to the support 2. A first channel 7 extends at least into the mounting foot 5 from an orifice 8 going through the support 2 to open into the first enclosure 30.

The sensor 10 comprises a silicon substrate 11 having opposite faces 11.1, 11.2, each provided with a first electrode 12 and 13, respectively. A second electrode 14 integral with the first face 15.1 of a first deformable membrane 15 extends opposite the first electrode 12. A third electrode 16 integral with the first face 17.1 of a second deformable membrane 17 extends opposite the first electrode 13. The first membrane 15 and the second membrane 17 extend at a distance d from the substrate 11.

The bracket 3 and the membranes 15 and 17 respectively comprise a peripheral annular bulge 9, 18 and 19 having a flat junction portion at their upper and lower parts. The bulges 9, 18 and 19 thus respectively define the periphery of the bracket 3, of the membrane 15 and of the membrane 17. The substrate 11 is substantially flat and comprises a peripheral portion 20 which defines the periphery thereof. As shown in FIG. 1, the substrate 11 is connected to the membranes 15 and 17 by assembling flat portions of their respective periphery. The bracket 3 is also connected to the membrane 15 by assembling their respective periphery.

The membrane 15 thus defines with the substrate 11 a second sealed enclosure 31 about the first electrode 12. Such enclosure 31 is limited by the periphery of the membrane 15, the face 15.1 of the membrane 15 and the face 11.1 of the substrate 11.

Similarly, the membrane 17 defines with the substrate 11 a third sealed enclosure 32 about the first electrode 13. Such enclosure 32 is limited by the periphery of the membrane 17, the face 17.1 of the membrane 17 and the face 11.2 of the substrate 11.

The enclosures 31 and 32 have a substantially null absolute pressure and are connected together by a conduit 22 going through the substrate 11.

The first sealed enclosure 30 is limited by the periphery of the bracket 3, the membrane 15, the face 4 of the bracket 3 and the face 15.2 of the membrane 15 opposite the face 15.1.

The sensor 10 also comprises a flat cover 21 which extends opposite the face 17.2 of the membrane 17 opposite the face 17.1 and the periphery of which is connected to the upper portion of the bulge 19 of the membrane 17. Together with the membrane 17, the cover 21 defines a fourth sealed enclosure 33 limited by the periphery 19, the lower face 21.1 of the cover 21 and the face 17.1 of the membrane 17. A second channel 40 providing a fluidic connection between the first enclosure 30 and the fourth enclosure 33 extends through the respective periphery of the first membrane 15, of the substrate 11 and of the second membrane 17. The enclosures 30 and 33 thus have the same pressure P.

The cover 21 comprises a processing unit 50 connected to the electrodes 12, 13, 14 and 16 via conductive wires 51. The processing unit 50, here an integrated circuit of the ASIC type (for «Application Specific Integrated Circuit»), is so arranged as to deliver an electric signal according to the distances from the first electrodes 12, 13 to the second 14 and the third 16 electrodes 15. The conductive wires 51 here go through the periphery of the membranes 15? 17 and of the substrate 11, as well as the cover 21. The processing unit 50 can be connected to a pad 61 integral with the support 2, using a conductive wire 60, for instance.

In operation, the fluid, the pressure of which has to be measured (which is a gas and for instance an inert gas or air) fills the channel 7 (via the orifice 8), the first enclosure 30, the channel 40, and the enclosure 33. Under the effect of pressure P, the membranes 15 and 17 buckle and the distances from the first electrodes 12 and 13 respectively to the second 14 and the third 16 electrodes vary. The capacity of the capacitors formed by the pairs of electrodes 12/14 and 13/16 are then modified and transmitted to the processing unit 50 via the conductive wires 51. The processing unit then converts such values into electric signals and transmits same via a conductive wire 60 to a circuit connected to a pad 61.

The device 1 advantageously receives, on the outer surface thereof and/or on the walls of the enclosures 30 and 33 a arylene coating so as to extend the longevity thereof specifically when the fluids, the pressure of which has to be measured are particularly aggressive.

Carbon coatings of the DLC type—for «Diamond Like Carbon»—are also adapted to the protection of outer surfaces of the sensor and/or the walls of the enclosures 30 and 33.

The second face 4.1 of the bracket 3 is so arranged here as to cooperate with end stops 62 positioned on the support 2.

As defined in the present application, "electrode" refers to any electrically conductive element. It then covers an element added on a substrate or a membrane as well as a portion of a substrate or a membrane (or even the whole of it) having electrical properties enabling it to define a capacitor electrode. A ceramic membrane is thus an electrode, as defined in the present application.

Of course, the invention is not limited to the described embodiment but encompasses any alternative solution within the scope of the invention as defined in the claims.

More particularly:
- although, here, the device substantially has the shape of a straight cylinder with a circular section, the invention also applies to other shapes of devices, such as for instance a cylindrical device having a square or rectangular direction curve, or still a spherical device;
- although here, the substrate of the sensor is made of silicon, the invention also applies to other types of substrates such as, for example a substrate made of silicon alloy, of multilayer high temperature cofired ceramic (HTCC) or of multilayer low temperature cofired ceramic (LTCC);
- although, here, the first and second membranes extend at identical distances from the faces of the substrate, the invention also applies to membranes which extend at different distances from the faces of the substrate;
- although here, the periphery of the membranes and of the support are defined by an annular bulge, the invention also applies to other types of periphery, such as for example, a wall having a rectangular section or peripheral spacers bonded to the support, to the substrate and/or to the membranes;

although here the cover is flat, the invention also applies to other shapes of covers such as, for example, a cover with a shape of a hemispherical dome;

although here, the second channel extends through the respective periphery of the membranes and of the substrate, the invention also applies to other configurations of the second channel, such as for example an outer conduit connecting the first and the fourth chambers, or an inner or an outer conduit connecting the first channel to the fourth chamber;

although here, the processing unit is an ASIC integral with the cover, the invention also applies to other processing means, such as for example a microcontroller, with the latter being possibly positioned on the support or on another element;

although here, the electrodes are connected to the processing unit by conductive wires going through the periphery of the membranes and of the substrate, the invention also applies to other connecting means which may comprise, for example conductive wires outside the sensor, or conductive tracks printed on the sensor;

although here the bulging of the membranes is measured by measuring the distance between the electrodes (for the sensor of the capacitive type), the invention also applies to other means for measuring the bulging of the membranes such as for example one or more piezoelectric elements like those of the sensors of the piezoresistive, piezoelectric or resonant types.

The invention claimed is:

1. A pressure measuring device comprising a bracket supporting a pressure sensor which defines a first sealed enclosure with a first face of the bracket, with the bracket having a second face from which a mounting foot protrudes, with a first channel extending at least into the foot to open into the first enclosure, with the pressure measuring device comprising a substrate having opposite faces, opposite which a first deformable membrane and a second deformable membrane respectively extend, with the first membrane and the second membrane extending at a distance from the substrate while defining therewith a second sealed enclosure and a third sealed enclosure, with the pressure sensor comprising a cover extending opposite the second membrane in order to define a fourth sealed enclosure connected through a second channel to the first enclosure, with the pressure sensor comprising means for measuring the deformation of the first and the second deformable membranes.

2. The device according to claim 1, wherein the means for measuring the deformation of the membrane comprise a pair of first electrodes each extending on one face of the substrate and opposite which a second electrode integral with the first deformable membrane and a third electrode integral with the second deformable membrane respectively extend.

3. The device according to claim 1, wherein the second channel extends through a periphery of the first deformable membrane of the substrate and of the second deformable membrane.

4. The device according to claim 1, wherein the cover comprises a processing unit for delivering an electric signal according to the distances from the first electrodes to the second and the third electrodes.

5. The device according to claim 1, wherein the second and third sealed enclosures have a substantially null absolute pressure.

6. The device according to claim 1, wherein the outer surface of the device comprises a parylene coating.

7. The device according to claim 1, wherein the outer surface of the device comprises a carbon coating of the DLC type.

8. The device according to claim 1, wherein the second face of the bracket is so arranged as to cooperate with end stops.

9. The device according to claim 1, wherein the bracket and the membranes comprise a peripheral annular bulge having a flat junction portion at their upper and lower parts, with the substrate being connected to the membranes by assembling flat portions of the respective periphery thereof and the bracket being connected with the first membrane by assembling the respective periphery thereof.

* * * * *